(12) United States Patent
Verstegen et al.

(10) Patent No.: US 7,935,213 B2
(45) Date of Patent: May 3, 2011

(54) NON-LEACHING ADHESIVE SYSTEM AND ITS USE IN A LIQUID IMMERSION OBJECTIVE

(75) Inventors: Emile Johannes Karel Verstegen, Eindhoven (NL); Johan George Kloosterboer, Eindhoven (NL); Hendrik Roelof Stapert, Eindhoven (NL); Jacobus Hermanus Maria Neijzen, Heeze (NL); Helmar van Santen, Amsterdam (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 12/629,155

(22) Filed: Dec. 2, 2009

(65) Prior Publication Data

US 2010/0071848 A1    Mar. 25, 2010

Related U.S. Application Data

(63) Continuation of application No. 10/568,837, filed as application No. PCT/IB2004/051397 on Aug. 5, 2004, now Pat. No. 7,642,297.

(30) Foreign Application Priority Data

Aug. 20, 2003    (EP) .................................... 03102607

(51) Int. Cl.
*B29C 65/00* (2006.01)
*B32B 37/12* (2006.01)
*B32B 7/12* (2006.01)

(52) U.S. Cl. ..................... 156/275.7; 428/65.2; 522/167; 522/173; 522/180; 522/182; 526/328; 528/376

(58) Field of Classification Search .................. 522/180, 522/173, 181, 182, 167; 526/328; 528/376; 156/275.7; 428/65.2

See application file for complete search history.

(56) References Cited

U.S. PATENT DOCUMENTS

| | | | |
|---|---|---|---|
| 4,020,233 | A | 4/1977 | Morgan |
| 4,308,367 | A | 12/1981 | Green et al. |
| 4,308,368 | A | 12/1981 | Kubo et al. |
| 4,906,675 | A | 3/1990 | Inagaki et al. |
| 4,908,395 | A | 3/1990 | Kurita et al. |
| 5,218,067 | A | 6/1993 | Uchida et al. |
| 5,278,199 | A | 1/1994 | Ohkawa et al. |
| 5,366,812 | A | 11/1994 | Takahashi et al. |
| 5,900,472 | A | 5/1999 | Fan et al. |
| 6,017,603 | A | 1/2000 | Tokuda et al. |
| 6,171,675 | B1 | 1/2001 | Iida |

(Continued)

FOREIGN PATENT DOCUMENTS

CN    1125460 A    6/1996

(Continued)

*Primary Examiner* — Susan W Berman

(57) ABSTRACT

A non-leaching adhesive system and its use in a liquid immersion objective for immersion-writing of masters for optical discs are disclosed. The adhesive system comprises at least one monomer, selected from among the group of acrylate and methacrylate monomers, allylic monomers, norbornene monomers, hybrid monomers thereof, containing chemically different polymerizable groups, and multifunctional thiol monomers, provided that said thiol is used in combination with at least one of said non-thiol monomers; and a polymerization initiator. At least one of said monomers, not being a thiol, is provided with at least two functional polymerizable groups to obtain a crosslinked polymer network. The polymerization initiator is preferably an initiator that can be activated both thermally and with UV radiation. The adhesive system may further contain a reactive diluent. Further the use of the present adhesive system in mounting a liquid immersion objective is disclosed.

15 Claims, 4 Drawing Sheets

U.S. PATENT DOCUMENTS

| | | |
|---|---|---|
| 6,180,200 B1 | 1/2001 | Ha et al. |
| 6,190,838 B1 | 2/2001 | Kerfeld |
| 6,201,099 B1 | 3/2001 | Petersen et al. |
| 6,376,702 B1 | 4/2002 | Kai et al. |
| 6,440,519 B1 * | 8/2002 | Takase et al. ............ 428/65.2 |
| 6,444,285 B1 | 9/2002 | Murakami |
| 6,451,948 B1 | 9/2002 | Woods et al. |
| 6,472,451 B2 | 10/2002 | Ha et al. |
| 6,627,287 B2 | 9/2003 | Kitsunai et al. |
| 2002/0032251 A1 | 3/2002 | Ha et al. |
| 2005/0119366 A1 | 6/2005 | Moy et al. |

FOREIGN PATENT DOCUMENTS

| | | |
|---|---|---|
| CN | 1192769 A | 9/1998 |
| CN | 1215419 A | 4/1999 |
| EP | 0074708 A2 | 3/1983 |
| EP | 0101267 A2 | 2/1984 |
| EP | 0413174 A2 | 2/1991 |
| EP | 0458471 A2 | 11/1991 |
| EP | 1005037 A1 | 5/2000 |
| JP | 58021607 A | 2/1983 |
| JP | 58021687 A | 2/1983 |
| JP | 58021688 A | 2/1983 |
| JP | 58128393 A | 7/1983 |
| JP | 58192891 A | 11/1983 |
| JP | 063042050 A | 2/1988 |
| JP | 3074310 A | 3/1991 |
| JP | 4227976 A | 8/1992 |
| JP | 9111189 A | 4/1997 |
| JP | 10255319 A | 9/1998 |
| JP | 11343460 A | 12/1999 |
| WO | 9429399 A1 | 12/1994 |
| WO | 9707171 A1 | 2/1997 |
| WO | 9735930 A1 | 10/1997 |
| WO | 0144400 A1 | 6/2001 |

* cited by examiner 0.7mm 0.7mm

NON-LEACHING ADHESIVE SYSTEM AND ITS USE IN A LIQUID IMMERSION OBJECTIVE

This is a continuation of Ser. No. 10/568,837 filed Feb. 17, 2006, now U.S. Pat. No. 7,642,297, which is a National Stage filing of PCT/IB04/51397, filed Aug. 5, 2004, and is incorporated by reference herein.

The present invention relates to the field of adhesive systems, and more particularly to a non-leaching adhesive system, which does not leach any harmful components or impurities into a liquid which is or becomes into contact with said adhesive system, when it has been cured. The term 'non-leaching' here refers to the absence of the leaching of compounds that are detrimental to the application in which the adhesive is used. Examples of such applications are the use in deep-UV mastering of high-density optical discs, the use in deep-UV lithography of silicon wafers, the use in liquid immersion lithography and in immersion microscopy in the biological field. Further important applications are in the assembly of catheters and other biomedical devices for applications likely to come into contact with fluids and tissue as well as in the construction of biosensors, notably those which contain assembled microfluidic structures. Also many applications are found in the veterinary and food & beverage industry. It is in such applications of the utmost importance that the liquid which comes into contact with the cured adhesive remains extremely pure, thus free of any contamination.

In liquid immersion microscopy, for example, the numerical aperture (NA) and consequently the resolution of the microscope objective is increased by applying an immersion liquid between the steady lens and a steady object. The adhesive forces of the liquid keep the object immersed. When the object moves, however, breakdown of immersion may occur, either by pulling the liquid away from the lens or by pulling gas under the objective. The key issue in applying liquid immersion in a dynamic system such as a mastering machine therefore is to maintain a stable liquid film between the stationary lens and the moving substrate.

In critical applications such as for example deep-UV mastering of high density (Blu-ray Disc) optical discs using a high NA liquid immersion objective for writing of information in a photo-resist layer on a master disc, the proper development of the photo-resist is often impeded by a low concentration of impurities in the immersion liquid. This contamination (which might be very little) is due to leaching of impurities from adhesives used in constructing the objective and immersion accessory.

Usually, two-component epoxy-amine or epoxy-anhydride adhesive systems are used. It then often occurs that alkaline impurities from the adhesive, or, when the adhesive has been dosed, mixed and/or cured improperly, unreacted amines, leach into the water phase and next into the resist. (Even epoxy-anhydride systems may contain leachable tertiary amine accelerators). The aimed contrast between exposed and non-exposed areas will then, locally, be changed or even removed, showing up as point defects or as stains in the master disc. Such defects will thereafter also be transferred to the stampers and replicated discs made from such master discs.

The same problem of a partially or totally undeveloped resist has been observed with several positive tone resists, belonging for example to the novolac-diazoquinone type of resists.

The present invention now provides an adhesive system which does not leach harmful impurities or components, and thus allows proper development of the exposed resist layer and subsequent stamper manufacturing.

More specifically, the invention relates to a non-leaching, curable, adhesive system, comprising at least one monomer, selected from among the group of acrylate and methacrylate monomers, allylic monomers, norbornene monomers, mixtures of said monomers and hybrid monomers containing chemically different polymerizable groups in one monomer and multifunctional thiol monomers, provided that said thiol is used in combination with at least one of said non-thiol-monomers; and a polymerization initiator. Preferably, at least one of said monomers, not being a thiol, is provided with at least two functional groups, which groups will take part in the polymerization process, to obtain a crosslinked polymer network. The term "multifunctional" as used here, means that the number of monomers which can be coupled per monomer is larger than 1.

Although virtually any monomer polymerizable by free radical initiation, can be used in the present adhesive system, those compounds are preferred which provide a cross-linked product with good adhesive properties to glass and metals. It is observed that the term "glass" as used here also refers to quartz-glass.

The diacrylate monomer which is more preferably used in the present adhesive system is 2,2-bis[4-(3-acryloyloxy-2-hydroxypropoxy)phenyl]propane.

Alternatively, thiol-ene systems composed of multithiols and multiallylic monomers and a (radical) polymerization initiator can be used, either separately or in combination with the above indicated (meth)acrylates. Non-limitative examples of thiols are trimethylolpropane trithiol, pentaerythritol tetrathiol and their ethoxylated homologs. Non-limitative examples of allylic monomers are the diallylic ester of isophorone diisocyanate, triallyl cyanurate and -isocyanurate and the di- and triallyl ethers of trimethylolpropane.

As indicated above, the adhesive system also contains a polymerization initiator. Preferably a single initiator that can be activated both thermally and with radiation, preferably UV radiation, is used.

Azobisisobutyronitrile is a good example, although many azoesters may be used as well.

Azoester-initiators have the advantage that they have, apart from their photochemical decomposition, a rather high decomposition rate at relatively low temperatures, which allows their use also at low and moderately high temperatures.

Examples of photo-initiators which decompose only at higher temperatures, and which can also be used in the present invention are α-hydroxy-ketones, such as Irgacure 184 and Darocure 1173 (both trademarks of Ciba-Geigy AG); α-amino-ketones, such as Irgacure 907 and Irgacure 369 (both trademarks of Ciba-Geigy AG) and benzyldimethyl-ketal, such as Irgacure 651 (=DMPA:α,α-dimethoxy-α-phenyl-acetophenone) (trademark of Ciba-Geigy AG).

The present adhesive system further comprises in an expedient embodiment, a reactive diluent. It is in this respect observed, that the di(meth)acrylate monomers to be used in the present adhesive system may have a viscosity at the operation temperature of, for example, 60° C., which is too high for proper application on the delicate substrates to be bonded. It is in these cases preferred to use a reactive diluent.

Said reactive diluent is either a monoacrylate but preferably a di- or multiacrylate and/or a methacrylate diluent, examples thereof are 1,6-hexanediol diacrylate and tripropyleneglycol diacrylate. Further examples include ethoxylated trimethylol propane tri(meth)acrylates and pentaerythritol tetra(meth)acrylates of sufficiently low viscosity.

To support the adhering properties of the present adhesive system to a substrate, especially a metal or glass substrate, it is preferred to pretreat such substrates with a proper surface activating agent. Such a surface pretreatment will aid in the prevention of delamination or other means of release of the adhesive from the substrate.

The invention therefore also relates to a non-leaching, curable, adhesive composition, based on monomers, comprising (a) an adhesive system as defined above, and (b) a surface activating agent.

Said surface activating agent is preferably an acrylic or methacrylic silane coupling agent. These agents can be used both with (meth)acrylate and thiol-ene systems. Alternatively, a thiol or an allylic coupling agent may also be used with the thiol-ene systems. It is in this respect observed that the use of a silane coupling agent together with an adhesive composition for bonding metal substrates is known as such from EP-A-1 005 037. Specific examples of such a coupling agent are nevertheless missing in this reference. Further, EP-A-1 005 037 relates to a cationic UV curable composition, preferably consisting of an epoxy resin as the main component and a cationic polymerization type photo-initiator. Such systems are characterized by their capability of leaching ionic compounds which are likely to affect the resist behavior.

As indicated above, the present invention relates, on the contrary, to an adhesive system based on acrylate and/or methacrylate monomers, allylic monomers, norbornene monomers, hybrid monomers of said monomers containing chemically different polymerizable groups, mixtures of said monomers and multifunctional thiol monomers, provided that said thiol is used in combination with at least one of said other, non-thiol monomers, and a polymerization initiator, which system does not leach any harmful component into a liquid which comes into contact with said adhesive system when it has been cured.

The methacrylic silane coupling agent of the present invention is preferably γ-methacryloyloxypropyl trimethoxysilane.

The present invention further relates to a process for ensuring the metal-to-metal and metal-to-glass adhesion by applying a coating of a non-leaching, curable, adhesive system, as defined above, to the surfaces of parts to be joined, joining the thus coated surfaces of said parts and curing the combination, wherein the surfaces to be joined are pretreated with a surface activating agent before the application of the adhesive system.

Such a pretreatment will further prevent delamination and/or leakage of water, as has been indicated above.

The surface activating agent is preferably an acrylic or methacrylic silane coupling agent, more preferably γ-methacryloyloxypropyl trimethoxysilane.

The pretreatment of the surface to be provided with an adhesive according to the present invention consists preferably of an exposure of said surface to the vapor of the coupling agent, if desired dissolved in a suitable solvent, or of a treatment of said surface with a solution of said coupling agent in a suitable solvent, or any other suitable process.

The invention further relates to the use of the present adhesive system for the adhesion of a metal film to another metal film or a glass substrate of a liquid immersion objective, to be used for the preparation of a substrate, in particular an optical master disc.

As has been explained before, leaching of traces of components from the adhesive, used in constructing the immersion objective and immersion accessory, into the immersion liquid, often has the result that the proper development of the resist layer on a master disc in said immersion microscope is impeded. The thus obtained defects show up as point defects or as stains; they appear not only in the resist layer of the master disc, but will also be transferred to the stampers and replicated discs made from such master discs.

The use of the present adhesive prevents this leaching problem, surprisingly, completely.

The invention further relates to a liquid immersion objective as defined in claim 16.

The above indicated and other aspects of the invention will be apparent from and elucidated with reference to the drawings and following examples, which are not to be interpreted as limiting the scope of the present invention in any respect.

FIGS. 1*a* and 1*b* show a cross-section and bottom view respectively of the liquid immersion concept used in optical disc mastering.

FIG. 1*c* shows details of the embodiment of the immersion lens mount and water supply accessory of FIG. 1*a*.

Figure 5A:
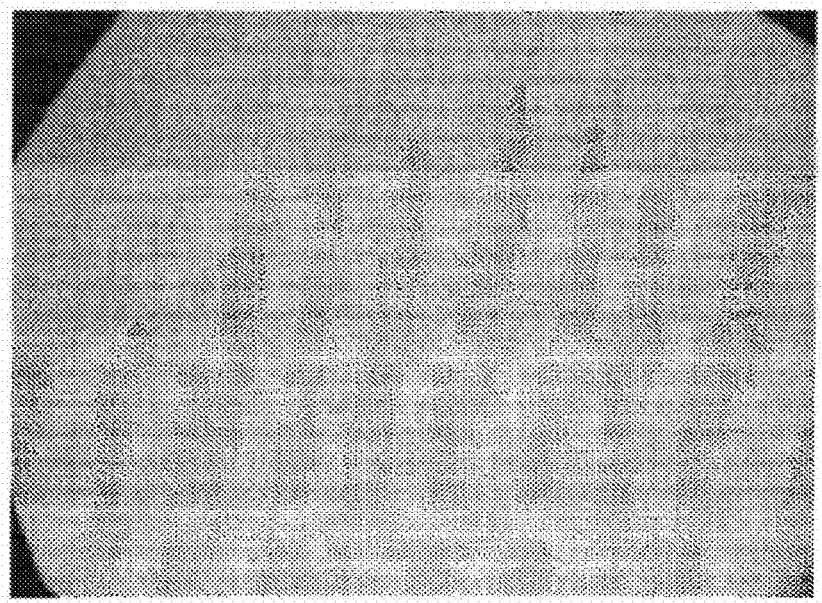

FIG. 5*a* shows a replicated disc, obtained by using an adhesive according to the invention, without stains or point defects (magnification 10×).

Figure 5B:
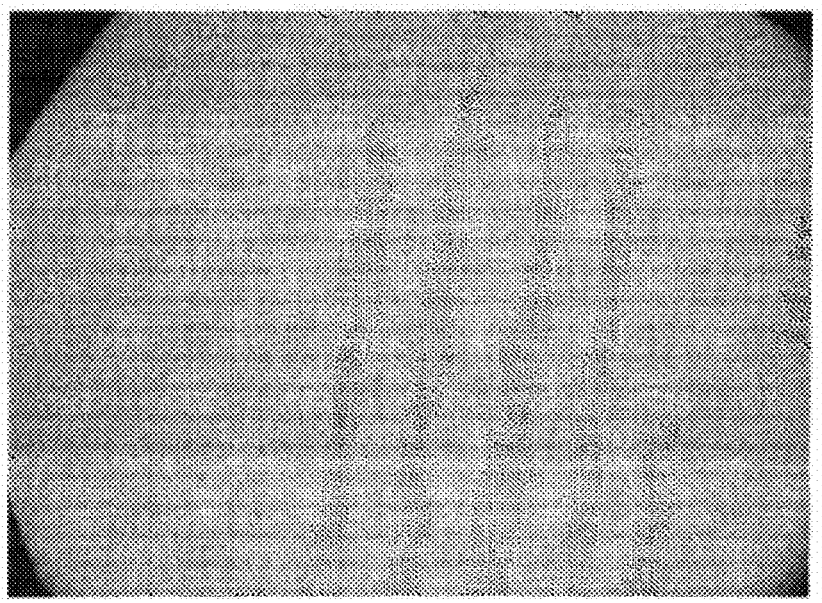

FIG. 5*b* shows the same disc as shown in FIG. 5*a*, but with a magnification of 20×.

Figure 1A:
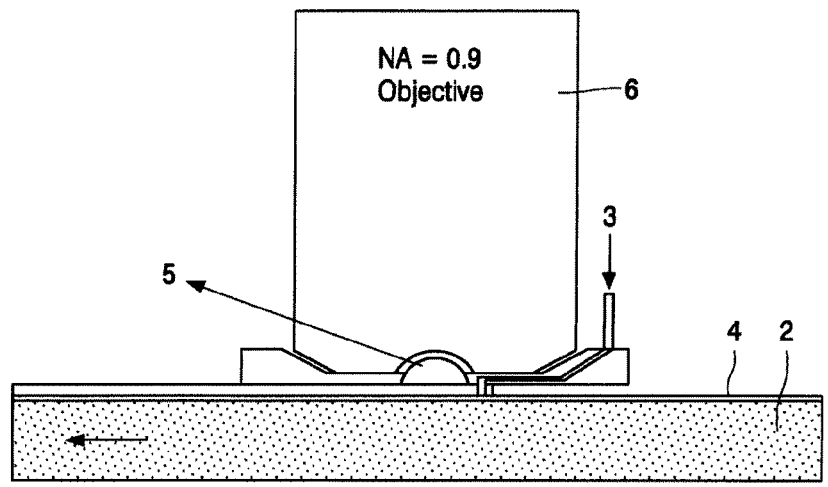

In the set-up used for immersion-writing of master discs for Blu-ray discs, this has been realized using the liquid immersion concept as illustrated in FIGS. 1*a*, *b* and *c*.

Figure 1B:
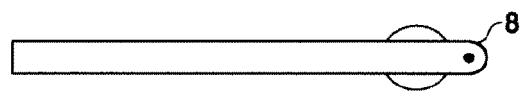

Liquid immersion is achieved by locally maintaining a water film between the final lens element 5 of the objective 6 and the rotating mastering disc 2 with the photo-resist 4 (see FIG. 1*a*). Water is a natural choice in this application for the immersion liquid as it is transparent for radiation with a wavelength of 257 nm used for writing and is compatible with resist processing. The objective used was a commercially available lens (numerical aperture (NA)=0.9, λ=257 nm) that is transformed into an NA=1.23 water immersion lens by adding an almost hemispherical final lens element (not shown). The water is continuously supplied through a hole 9 just upstream of the immersion lens 5 at a pressure, sufficiently high in order to avoid gas inclusion and sufficiently low to prevent the release of dissolved gas. The bottom view in FIG. 1*b* shows how the relative velocity of lens and coated disc pull the water under the lens resulting in a stable water trace around the focus position. The water trace typically is 7 μm high and 200 μm wide at writing velocities up to 5 m/s. The forces exerted by this narrow water trace on the lens 5 are minimal so that the focus actuation is not hampered by the presence of the water film.

The construction of the immersion lens mounting and water supply had to be realized within the original working distance of the far field objective, which is only 250 μm. This has resulted in a very slim mount for the immersion lens, 200 μm thick only, containing a water supply channel 8. The lens mount consists of a stack of four metal foils 7, shown in FIG. 1*c*, which are shaped and glued together in such a way that a water supply channel 8 is created.

The water passes through a hole 9 in the lower foil of the stack of foils 7 to reach the interface between objective 6 and disc 2. This means that the water used for immersion is in close contact with the adhesive. The adhesive in the stack of foils 7 has to be cured thermally since it is not accessible to UV light.

The final immersion lens element has to be firmly attached to the foil accessory. This is also achieved by gluing. Here, a UV curable adhesive is preferred since high temperatures are to be avoided in order to reduce the build-up of stress, relaxation thereof and consequently inaccurate positioning of the immersion lens element 5.

When conventional adhesives are used, such as epoxy-amine/anhydride based adhesives, it often occurs that the resist remains partially or totally undeveloped after rinsing or spraying with or dipping into the aqueous developer solution. The defects show up as point defects (FIG. 2) or as stains (FIG. 3). The defects not only show up in the resist layer but are also transferred to the stampers and replicated discs made from such masters. A detail of a point defect on a father stamper is shown in FIG. 4. The resist is locally undeveloped.

Figure 2:
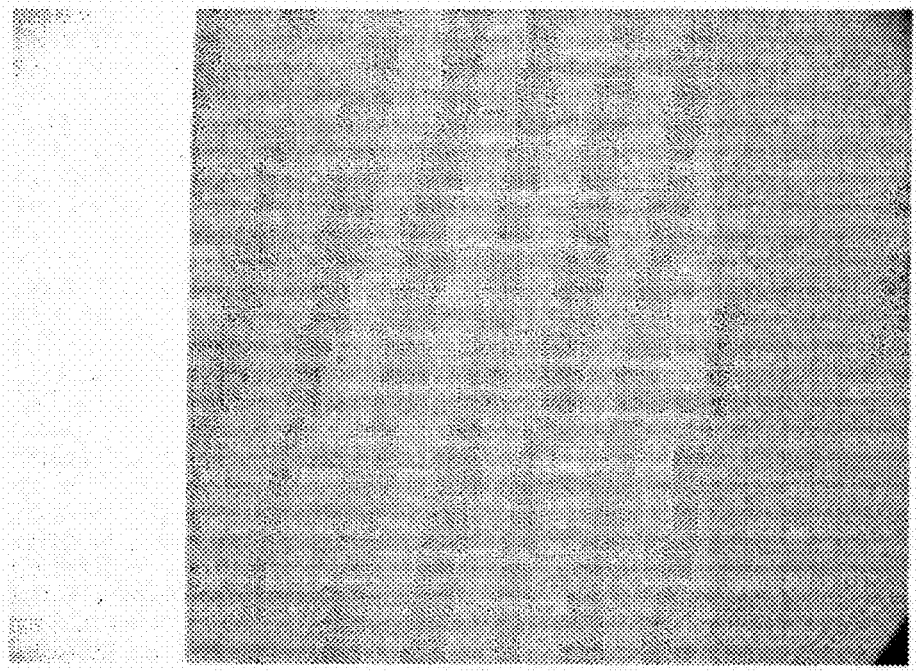
FIG. 2 shows point defects, obtained on a replicated disc by using a conventional adhesive in the liquid immersion microscope.
Figure 3:
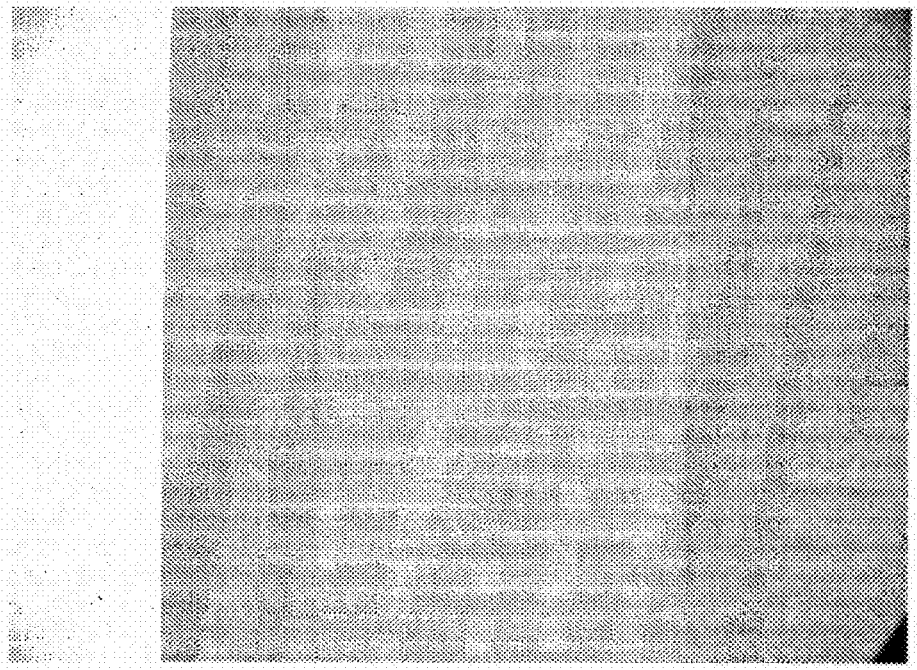
FIG. 3 shows stains, obtained on a replicated disc by using a conventional adhesive in the liquid immersion objective.
Figure 4:
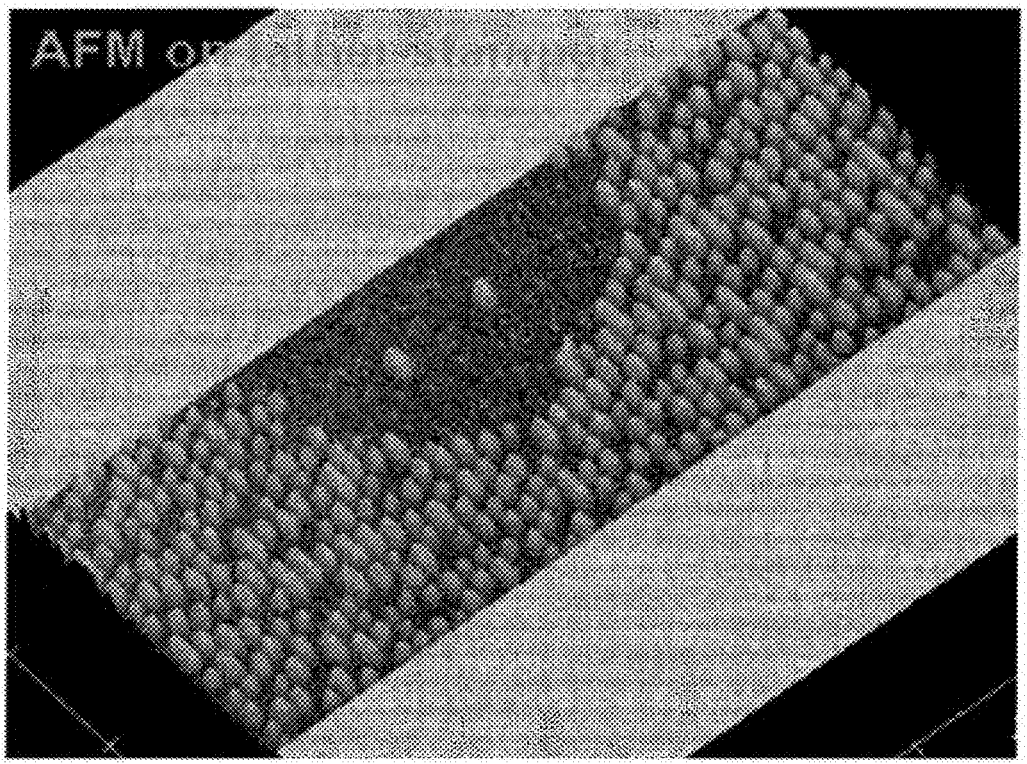
FIG. 4 is an AFM picture showing point defects on the father stamper produced by using a conventional adhesive in the liquid immersion objective.

The track width in FIGS. 2 and 3 was 0.7 mm, while the track pitch in FIG. 4 was 320 nm.

Figure 1C:
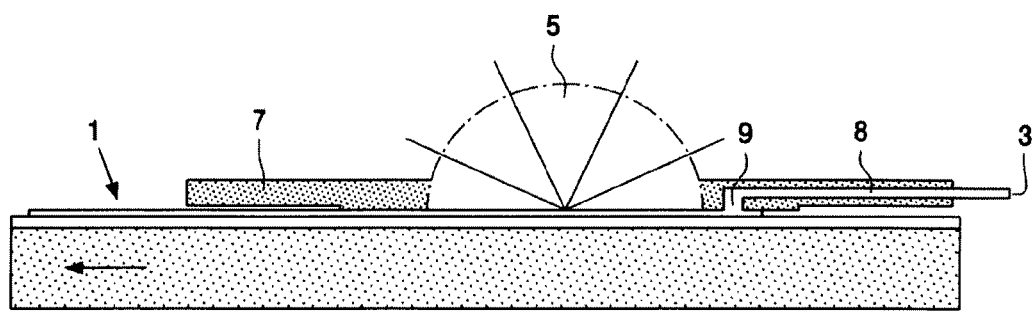

FIG. 5a and FIG. 5b show a replicated disc produced by using an immersion microscope described in FIGS. 1a, 1b and 1c, mounted by using an adhesive according to the invention. The track width in FIGS. 5a and 5b was 0.4 mm.

Example 1

An adhesive was prepared by mixing a 80% (w/w) solution of 2,2-Bis[4-(3-acryloyloxy-2-hydroxypropoxy)phenyl]propane (=bis-GAA) in 1,6-hexanedioldiacrylate with 0.1% (b.w.) of azobisisobutyronitrile.

This adhesive was used in the lamination of the stack of foils and the gluing of the objective lens as shown in FIGS. 1a and 1b. The adhesive between the foils was cured by heating the stack of foils to 90° C. for 12 h. The objective lens was fixed to the stack of foils by exposure of the same adhesive to UV light (wavelength range 320-390 nm, intensity 40 mW.cm$^{-2}$, exposure time 1 min.).

It appeared that the adhesive system did not leach out impurities as shown by a proper development of the exposed resist layer and subsequent stamper manufacturing by means of an immersion microscope objective as shown in FIGS. 1a, 1b and 1c.

The excellent quality of the adhesive system is further illustrated by the absence of stains and pinholes on replicated discs, as shown in FIGS. 5a and 5b.

Example 2

An adhesive was prepared according to Example 1, but by using bis-GAA as a 75% (w/w) solution in tripropyleneglycoldiacrylate.

The same results as indicated in Example 1 were obtained.

Example 3

To further prevent delamination and/or leakage of water (if possible, at all), the surfaces to be bonded with each other, were subjected to a pretreatment with a liquid silane coupling agent. More specifically, the metal foils and the immersion lens were placed in a desiccator, which contained an open vessel with γ-methacryloyloxypropyltrimethoxysilane.

The desiccator was evacuated and the metal foils and lens were exposed overnight to the vapor of said coupling agent. Thereafter the parts were bonded by using the adhesive and procedure indicated in Example 1.

Neither stains nor point defects were observed upon development of master discs made using the mastering device depicted in FIG. 1b.

Comparative Example 1

Discs replicated from stampers made using a liquid immersion microscope system as outlined in FIG. 1c that was constructed by using a conventional epoxy-amine adhesive, namely Araldite 2011 (trademark of Vantico) showed many point defects and stains as shown in FIGS. 2 and 3. The defects were already present on the stamper used for replicating the disks (FIG. 4).

While the present invention is described with respect to specific embodiments thereof, it is recognized that various modifications and variations thereof may be made without departing from the scope and spirit of the invention, which is more clearly understood by reference to the claims appended hereto. Any reference signs in the claims shall, further, not be construed as limiting the scope of the invention.

The invention claimed is:

1. A process for the metal-to-metal and metal-to-glass adhesion by applying a coating of a curable, adhesive system to the surfaces of parts to be joined, joining the thus coated surfaces of said parts and curing the combination, wherein the surfaces to be joined are pretreated with a surface activating agent before the application of the adhesive system, the curable, adhesive system consisting essentially of:

(1) at least one monomer, polymerizable by free radical initiation, selected from the group consisting of: 2,2-bis [4-(3-acryloyloxy-2-hydroxypropoxy)phenyl]propane, 2,2-bis[4-(3-methacryloyloxy-2-hydroxypropoxy)phenyl]propane, diallylic ester of isophorone diisocyanate, triallyl cyanurate, triallyl isocyanurate, and di- and triallyl ethers of trimethylolpropane, norbornene monomers, trimethylolpropane trithiol, pentaerythritol tetrathiol and their ethoxylated homologues, mixtures of said monomers, and hybrid monomers of said monomers containing chemically different polymerizable groups in one monomer; provided that when said at least one monomer is a said thiol monomer, said thiol monomer is used in combination with at least one non-thiol monomer of said acrylate monomers, methacrylate monomers, allylic monomers, norbornene monomers, mixtures of said monomers, and/or hybrid monomers of said monomers; and (2) a polymerization initiator, said adhesive system being a non-leaching system which, when in contact with liquid or liquid film present in an application in which the cured adhesive system is used, does not leach compounds that are detrimental to the application.

2. The process of claim 1, wherein said allylic monomer is selected from the group consisting of the diallylic ester of isophorone diisocyanate, triallyl cyanurate or -isocyanurate, and di- or triallyl ether of trimethylolpropane.

3. The process of claim 1, wherein said multifunctional thiol is selected from the group of trimethylolpropane trithiol, pentaerythritol tetrathiol, and the ethoxylated homologs of these compounds.

4. The process of claim 1, wherein said acrylate monomer is 2,2-bis[4-(3-acryloyloxy-2-hydroxypropoxy)phenyl]propane.

5. The process of claim 1, wherein said initiator is a photoinitiator, especially an UV initiator, a thermal initiator, or a combination of both.

6. The process of claim 1, wherein said system further comprises a reactive diluent.

7. The process of claim 1, wherein said reactive diluent is an acrylate or a methacrylate diluent, preferably a di- or multi-acrylate or methacrylate diluent.

8. The process of claim 1, further comprising a surface activating agent.

9. The process of claim 8, wherein said surface activating agent is an acrylic or methacrylic silane coupling agent.

10. The process of claim 9, wherein said methacrylic silane coupling agent is γ-methacryloyloxypropyltrimethoxysilane.

11. A process according to claim 1, wherein said surface activating agent is an acrylic or methacrylic silane coupling agent.

12. A process according to claim 11, wherein said methacrylic silane coupling agent is γ-methacryloyloxypropyltrimethoxysilane.

13. A method for using a curable, adhesive system, based on monomers for the preparation of an optical master disc, comprising the steps of:
    providing a first metal film
    providing another metal film or a glass substrate of a liquid immersion objective,
    applying and curing a curable, adhesive system between the first metal film and the other metal film or the glass substrate to form the optical master disc, the curable, adhesive system consisting essentially of:
    (1) at least one monomer, polymerizable by free radical initiation, selected from the group consisting of: 2,2-bis[4-(3-acryloyloxy-2-hydroxypropoxy)phenyl]propane, 2,2-bis[4-(3-methacryloyloxy-2-hydroxypropoxy)phenyl]propane, diallylic ester of isophorone diisocyanate, triallyl cyanurate, triallyl isocyanurate, and di- and triallyl ethers of trimethylolpropane, norbornene monomers, trimethylolpropane trithiol, pentaerythritol tetrathiol and their ethoxylated homologues, mixtures of said monomers, and hybrid monomers of said monomers containing chemically different polymerizable groups in one monomer; provided that when said at least one monomer is a said thiol monomer, said thiol monomer is used in combination with at least one non-thiol monomer of said acrylate monomers, methacrylate monomers, allylic monomers, norbornene monomers, mixtures of said monomers, and/or hybrid monomers of said monomers; and
    (2) a polymerization initiator, said adhesive system being a non-leaching system which, when in contact with liquid or liquid film present in an application in which the cured adhesive system is used, does not leach compounds that are detrimental to the application.

14. A liquid immersion objective, for an optical master disc, comprising a stack of metal films (8), an immersion objective lens (5), being provided in a through-hole (9), in said stack of metal films, and a substrate (2), being provided with a photo-resist layer (4) facing the immersion lens (5), wherein said photo-resist layer and the immersion lens are separated by a water film (1), wherein the water supply channel (3) discharges into the interface between said objective lens and said substrate, and wherein said metal films and immersion lens are bonded by applying and curing a curable, adhesive system consisting essentially of:

(1) at least one monomer, polymerizable by free radical initiation, selected from the group consisting of: 2,2-bis[4-(3-acryloyloxy-2-hydroxypropoxy)phenyl]propane, 2,2-bis[4-(3-methacryloyloxy-2-hydroxypropoxy)phenyl]propane, diallylic ester of isophorone diisocyanate, triallyl cyanurate, triallyl isocyanurate, and di- and triallyl ethers of trimethylolpropane, norbornene monomers, trimethylolpropane trithiol, pentaerythritol tetrathiol and their ethoxylated homologues, mixtures of said monomers, and hybrid monomers of said monomers containing chemically different polymerizable groups in one monomer; provided that when said at least one monomer is a said thiol monomer, said thiol monomer is used in combination with at least one non-thiol monomer of said acrylate monomers, methacrylate monomers, allylic monomers, norbornene monomers, mixtures of said monomers, and/or hybrid monomers of said monomers; and
(2) a polymerization initiator, said adhesive system being a non-leaching system which, when in contact with liquid or liquid film present in an application in which the cured adhesive system is used, does not leach compounds that are detrimental to the application.

15. A method for using a non-leaching, curable, adhesive system for the mutual adhesion of at least two bodies, the method comprising the steps of:
    providing a first and a second body selected from among the group consisting of metal films, (quartz-)glass substrates, and polymeric films,
    applying and curing a curable, adhesive system between the first and second bodies for the manufacturing and/or assembling of catheters, biosensors and other biomedical devices likely to come into contact with fluids and tissue,
    the curable, adhesive system consisting essentially of:
    (1) at least one monomer, polymerizable by free radical initiation, selected from the group consisting of: 2,2-bis[4-(3-acryloyloxy-2-hydroxypropoxy)phenyl]propane, 2,2-bis[4-(3-methacryloyloxy-2-hydroxypropoxy)phenyl]propane, diallylic ester of isophorone diisocyanate, triallyl cyanurate, triallyl isocyanurate, and di- and triallyl ethers of trimethylolpropane, norbornene monomers, trimethylolpropane trithiol, pentaerythritol tetrathiol and their ethoxylated homologues, mixtures of said monomers, and hybrid monomers of said monomers containing chemically different polymerizable groups in one monomer; provided that when said at least one monomer is a said thiol monomer, said thiol monomer is used in combination with at least one non-thiol monomer of said acrylate monomers, methacrylate monomers, allylic monomers, norbornene monomers, mixtures of said monomers, and/or hybrid monomers of said monomers; and
    (2) a polymerization initiator, said adhesive system being a non-leaching system which, when in contact with liquid or liquid film present in an application in which the cured adhesive system is used, does not leach compounds that are detrimental to the application.

* * * * *